US008756428B2

(12) United States Patent
Touzeau et al.

(10) Patent No.: US 8,756,428 B2
(45) Date of Patent: Jun. 17, 2014

(54) AUTHENTICATION METHOD FOR AN ELECTRONIC DOCUMENT AND VERIFICATION METHOD OF A DOCUMENT THUS AUTHENTICATED

(75) Inventors: Julien Touzeau, Toulouse (FR); Olivier Bastien, La Salvetat Saint Gilles (FR)

(73) Assignee: Airbus Operations SAS, Toulouse (FR)

( * ) Notice: Subject to any disclaimer, the term of this patent is extended or adjusted under 35 U.S.C. 154(b) by 816 days.

(21) Appl. No.: 12/029,907

(22) Filed: Feb. 12, 2008

(65) Prior Publication Data
US 2008/0250247 A1 Oct. 9, 2008

(30) Foreign Application Priority Data

Feb. 13, 2007 (FR) ...................................... 07 53233

(51) Int. Cl.
*H04L 9/32* (2006.01)
*G06F 11/30* (2006.01)
(52) U.S. Cl.
USPC ........... 713/178; 713/155; 713/168; 713/171; 713/181
(58) Field of Classification Search
USPC .......................................................... 713/178
See application file for complete search history.

(56) References Cited

U.S. PATENT DOCUMENTS

| 6,367,013 | B1 | 4/2002 | Bisbee et al. | |
| 6,587,945 | B1 * | 7/2003 | Pasieka | 713/176 |
| 7,194,620 | B1 * | 3/2007 | Hayes | 713/157 |
| 7,715,819 | B2 * | 5/2010 | Rockwell | 455/404.1 |
| 2002/0091928 | A1 * | 7/2002 | Bouchard et al. | 713/178 |
| 2002/0111913 | A1 | 8/2002 | Tallent et al. | |
| 2003/0027550 | A1 * | 2/2003 | Rockwell | 455/410 |
| 2003/0109973 | A1 * | 6/2003 | Hensey et al. | 701/35 |
| 2003/0159048 | A1 * | 8/2003 | Matsumoto et al. | 713/178 |
| 2003/0233552 | A1 * | 12/2003 | Baldwin et al. | 713/176 |
| 2004/0049675 | A1 * | 3/2004 | Micali et al. | 713/158 |
| 2004/0086121 | A1 * | 5/2004 | Viggiano et al. | 380/255 |
| 2005/0160476 | A1 * | 7/2005 | Kakii | 726/5 |
| 2005/0267860 | A1 * | 12/2005 | Benguigui | 707/1 |
| 2006/0112419 | A1 * | 5/2006 | Brown et al. | 726/5 |
| 2007/0028095 | A1 * | 2/2007 | Allen et al. | 713/156 |
| 2007/0074036 | A1 * | 3/2007 | Ramzan et al. | 713/176 |
| 2007/0083766 | A1 * | 4/2007 | Farnham et al. | 713/176 |
| 2007/0204078 | A1 * | 8/2007 | Boccon-Gibod et al. | 710/54 |

(Continued)

FOREIGN PATENT DOCUMENTS

| EP | 1 471 682 A1 | 10/2004 |
| FR | 2899408 A1 * | 10/2007 |
| WO | WO 2007/106280 A1 | 9/2007 |

*Primary Examiner* — Andrew Goldberg
*Assistant Examiner* — Gary Gracia
(74) *Attorney, Agent, or Firm* — Oblon, Spivak, McClelland, Maier & Neustadt, L.L.P.

(57) ABSTRACT

A computerized authentication method of an electronic document, in particular a file designed to be on-board an aircraft. The method includes generating a digital signature of the electronic document using a private key corresponding to a public key certified by a certifying authority, and sending via the Internet a time stamp request of the electronic document to a time stamping authority and receiving in response thereto a time-stamp signed by the certifying authority. The method includes sending via the Internet a request to an Online Certificate Statute Protocol (OCSP) server and receiving in response thereto a statute of the certificate of the public key, and adding to the electronic document of the digital signature, the time-stamp and the statute of the certificate to create an authenticated electronic document.

7 Claims, 3 Drawing Sheets

(56) References Cited

U.S. PATENT DOCUMENTS

| | | | |
|---|---|---|---|
| 2007/0220259 A1* | 9/2007 | Pavlicic | 713/176 |
| 2007/0234408 A1* | 10/2007 | Burch et al. | 726/6 |
| 2007/0239986 A1* | 10/2007 | Viggiano et al. | 713/168 |
| 2007/0260877 A1* | 11/2007 | Adams et al. | 713/156 |
| 2007/0264953 A1* | 11/2007 | Srinivasan et al. | 455/186.1 |
| 2008/0052517 A1* | 2/2008 | Anstey et al. | 713/176 |
| 2008/0133906 A1* | 6/2008 | Parkinson et al. | 713/156 |
| 2008/0141365 A1* | 6/2008 | Soegtrop | 726/21 |
| 2009/0106560 A1* | 4/2009 | Chopart | 713/189 |
| 2010/0036547 A1* | 2/2010 | Myers et al. | 701/3 |

* cited by examiner

AUTHENTICATION METHOD FOR AN ELECTRONIC DOCUMENT AND VERIFICATION METHOD OF A DOCUMENT THUS AUTHENTICATED

TECHNICAL FIELD

This invention relates in general to the field of digital security and in particular to that of the security of files aboard an aircraft.

STATE OF THE PRIOR ART

The maintenance, configuration or updating operations of an aircraft frequently requires programmes or data files to be uploaded to on-board aircraft computers or systems.

This uploading of files may be carried out via a data loader terminal (not on-board), via an upload gateway (on-board), connected to one or several items of equipment of the aircraft.

Traditionally, the files to be uploaded are organised according to a format standardised by the ARINC 665 standard, available on the site www.arinc.com. This format essentially comprises a header file containing a list identifying the files to be uploaded, followed by the data files themselves, and one or several support files. The header file also includes an error detection code (CRC) which permits the integrity of the files received to be checked.

The uploading of the files thus organised itself complies with a specific communication protocol, standardised in the ARINC 615-3 and/or ARINC 615A standard. According to this protocol, the data loader terminal first transmits the header file mentioned above to the equipment it is intended for. The latter takes the list of files to be uploaded and verifies their integrity progressively as it receives them from the data loader terminal.

Such a file uploading method is disclosed in the prior art, especially in the patent application FR-A-2837585 filed in the name of the present applicant.

This uploading method however no longer satisfies the digital security requirements now demanded from on-board equipment. In particular, the CRC code mentioned above only permits at best to check if a file is free of errors, for example from transmission or saving errors. It can be imagined therefore that it would be easy to alter voluntarily the contents of a file and to recalculate the CRC code, such that no error would be detected during the verification of the integrity of the file. Consequently, a malicious action to modify the file could indeed remain undetected.

In order to fight the various types of threats that weigh on the operations of an aircraft, and in particular to protect against computer piracy, it is now essential to verify the authenticity of the uploaded files. By authenticity of a file, it is meant both the guarantee of its origin, which is to say the fact that it is indeed from the file supplier (for example an aircraft manufacturer, an airline company, etc.), and the guarantee of the integrity of its content, which is to say that the latter has not been altered accidentally or intentionally.

One known solution to verify the authenticity of a file is to rely on a digital signature which uses an asymmetrical cryptographic algorithm and a public key infrastructure. According to this set-up, the supplier signs a digital fingerprint of the file using its private key and attaches the corresponding public key to the signed file, generally certified by a certifying authority. The file user may verify that the file in question is indeed that originally signed by the supplier using the public key and the digital signature. The certificate supplied by the certifying authority confirms that the public key indeed belongs to the supplier.

In practice, such a certificate has a limited length of validity (generally one year), substantially less than the operating life of commercial aircraft. However, when the certificate expires, the public key loses its validity and the files that have been signed with the corresponding private key consequently have their authenticity invalidated. In order to extend the authentication, the supplier may periodically add a new digital signature to files that have already been supplied and supply them again to its customers. This means however that the customers would have to update systematically all of the files on-board. This solution, even though it is technically feasible, would be very penalising in terms of operating cost, both for the supplier and the airline company.

The purpose of this invention is therefore to propose a file authentication method that is not affected by expiry, which is to say that it permits a guarantee once and for all of the integrity and the origin of a file, when it is created.

DESCRIPTION OF THE INVENTION

This invention is defined by an authentication method for an electronic document, in particular for a file designed for on-board aircraft use, comprising:
the generation of a digital signature of said electronic document using a private key corresponding to a public key certified by a certifying authority;
a time stamp request of said electronic document from a time stamping authority to obtain a time-stamp signed by this authority;
a request to obtain the statute of the certificate of said public key, following on from said time stamp request;
the addition to said electronic document of the digital signature, the time-stamp and the statute of said certificate to create an authenticated electronic document.

According to a first embodiment, the document comprises a file and the signature of the document is obtained by encoding a digital fingerprint of said file with said private key.

The document may be of the XML type and the signature of the document is then provided in the XMLDsig format.

According to a second embodiment, the document comprises a plurality de files and the digital signature of the document is obtained by:
the generation of an individual digital fingerprint for each of said files;
the generation of a collective digital fingerprint for all of said files from their individual digital fingerprints;
the encoding of the collective digital fingerprint from said private key.

The document advantageously complies with the format of the ARINC 665 standard for an aircraft application.

The certificate of the public key advantageously complies with the format of the X.509 standard.

The request to obtain the statute of the public key certificate is typically transferred to an OCSP server.

The invention also relates to a verification method for the validity of an electronic document authenticated using the authentication method described above, said verification method comprising:
a verification step of the digital signature of said electronic document;
a verification step of the time-stamp signed by the time stamping authority;
a verification step of the statute of the certificate of the public key;

a step for determining the validity of the electronic document, wherein the document is declared valid if the previous verifications are positive.

When the document comprises several files, the verification steps of said digital signature and of said time-stamp use a collective digital fingerprint of said files, wherein said digital fingerprint is obtained using individual digital fingerprints from each of these files.

BRIEF DESCRIPTION OF THE DRAWINGS

Other characteristics and advantages of the invention will become clearer upon reading one preferred embodiment of the invention made in reference to the attached figures among which.

DETAILED DESCRIPTION OF SPECIFIC EMBODIMENTS

The invention is based on the principle that if an electronic document is considered as valid at a given moment, its validity may only be later brought into question by proof of the contrary. In other words, the user of the document in question simply needs to ensure that it is authentic at the date at which it is signed.

Figure 1:
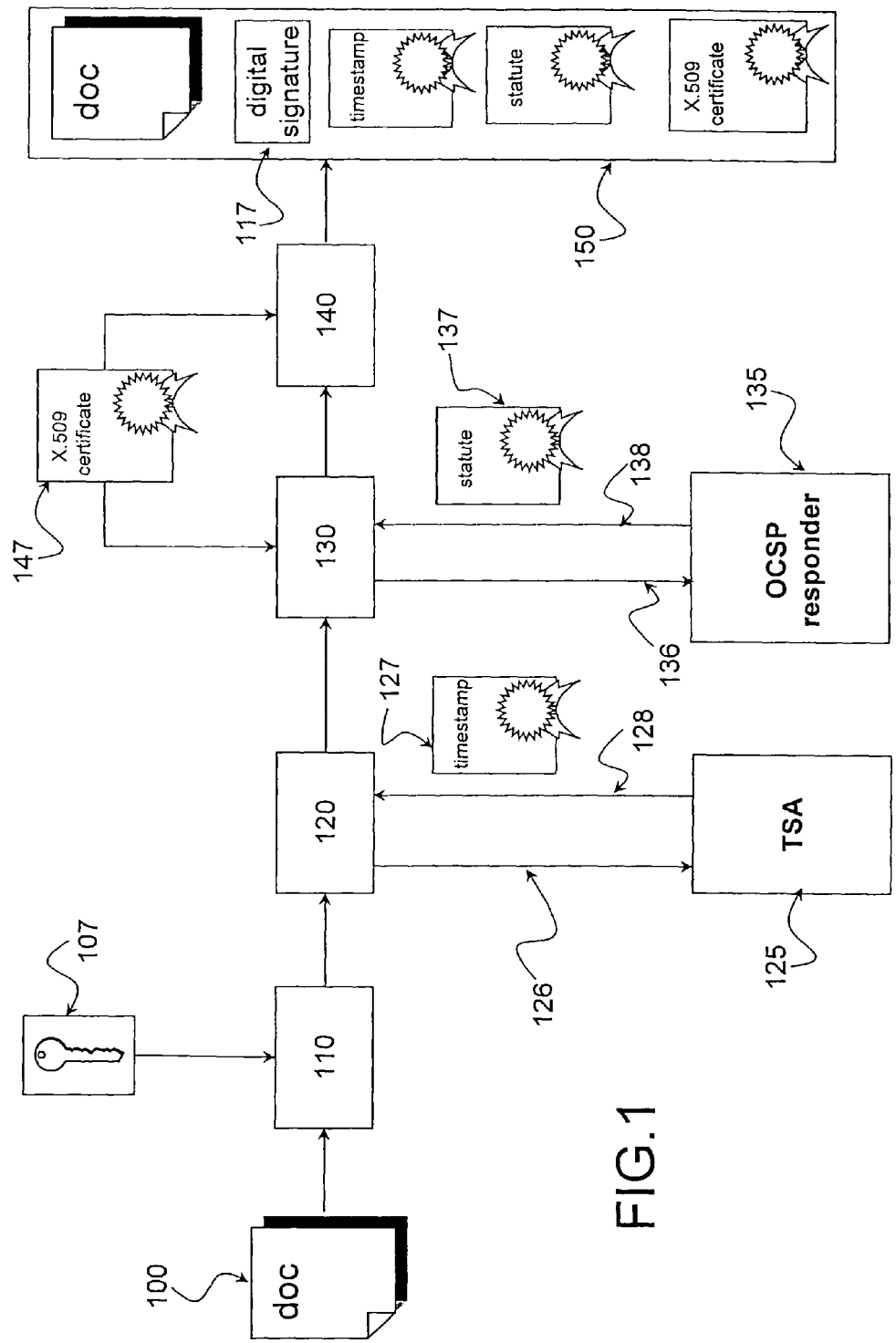
FIG. 1 diagrammatically illustrates the authentication method of an electronic document according to a first embodiment of the invention.

FIG. 1 diagrammatically shows the authentication method according to one embodiment of the invention.

In the following description an electronic document to be authenticated 100 will be considered. This document may comprise a programme and/or data file or even a plurality of such files. The case of the document which comprises a single file will be covered first.

It is supposed that the document supplier has an asymmetrical coding programme, a bi-key composed of a private key 107 from the corresponding public key and an electronic certificate 147 certifying that said public key indeed belongs to the supplier. The certificate will have been issued by a trusted third party, for example a certifying authority. This certificate will advantageously comply with the X.509 format, the cryptographic standard of the International Telecommunications Union for public key infrastructures (PKI).

In a first step 110, the supplier signs the electronic document using its private key 107. More precisely, a digital fingerprint of this document, typically obtained by a hashing function, is encoded using said private key. The result is a digital signature 117.

If the electronic document is in the XML format, the signature of the document will advantageously be made according to the XMLDsig format, such as that recommended by the W3C (World Wide Web Consortium).

Then the document 100 is time stamped. To achieve this, a time stamp request is sent to a trusted time stamping authority TSA (trusted Time Stamping Authority). The argument of this request is the digital fingerprint of the signature 117 and possibly the document 100 itself. To this end, it is possible to use the same hashing function. The time stamp server 125 creates, from the digital fingerprint that is transmitted to it, a signed time-stamp, in a manner known as such. More precisely, the time stamp server generates a time-stamp indicating the moment at which the time-stamp is generated, for example in the form (date, hour, minute), the latter concatenates the digital fingerprint that is transmitted to it and produces a digital fingerprint of the concatenated unit. This fingerprint is then encoded using the private key of the time stamping authority to obtain a signature for the time-stamp. The server 125 returns in 128 the time-stamp bearing the signature thus obtained. The format of the time-stamp is standardised by the RFC 3161 standard of the IETF.

At step 130, following on from step 120 (which is to say which occurs in general at most a few seconds or a few minutes after the latter), the validity of the public key is verified. To achieve this, a verification request 136 is transmitted via Internet to an OCSP server (Online Certificate Statute Protocol) which is also called an OCSP responder. This request further contains the serial number of the certificate, and the name of the certifying authority. The format of this request is standardised by the RFC 2560 standard of the IETF. The OCSP server verifies the statute of the certificate in the data base of the certifying authority (or the data bases of the certification authorities in the event of certificates being chained) The OCSP server returns a signed response or statute, 137, indicating that the certificate is valid as the certificate has not expired or been revoked. The format of this response is also standardised by the RFC 2560 standard of the IETF.

At step 140, an authenticated document is created from the initial document 100 to which are added the digital signature of the document by the supplier, 117, the time-stamp signed by the time stamping authority, 127, the statute of the certificate (or of the chain of certificates) the public key, signed by the OCSP server, 137, as well as the certificate itself emitted by the certifying authority, 147.

When the document 100 is multi-file, the authentication may of course be carried out at the level of each file as previously described. Each file is then considered simply as an electronic document in itself.

According to a second embodiment of the invention, advantageously an individual digital fingerprint is generated for each file of the document and then a collective digital fingerprint of the set of files from these individual fingerprints. The signature of the document is obtained by encoding the collective fingerprint using the private key of the supplier.

The time stamping is also common to said files. To achieve this, the collective fingerprint of said files is transmitted as the argument of the request 126. Steps 130 and 140 are identical to those of the first embodiment.

Figure 2:
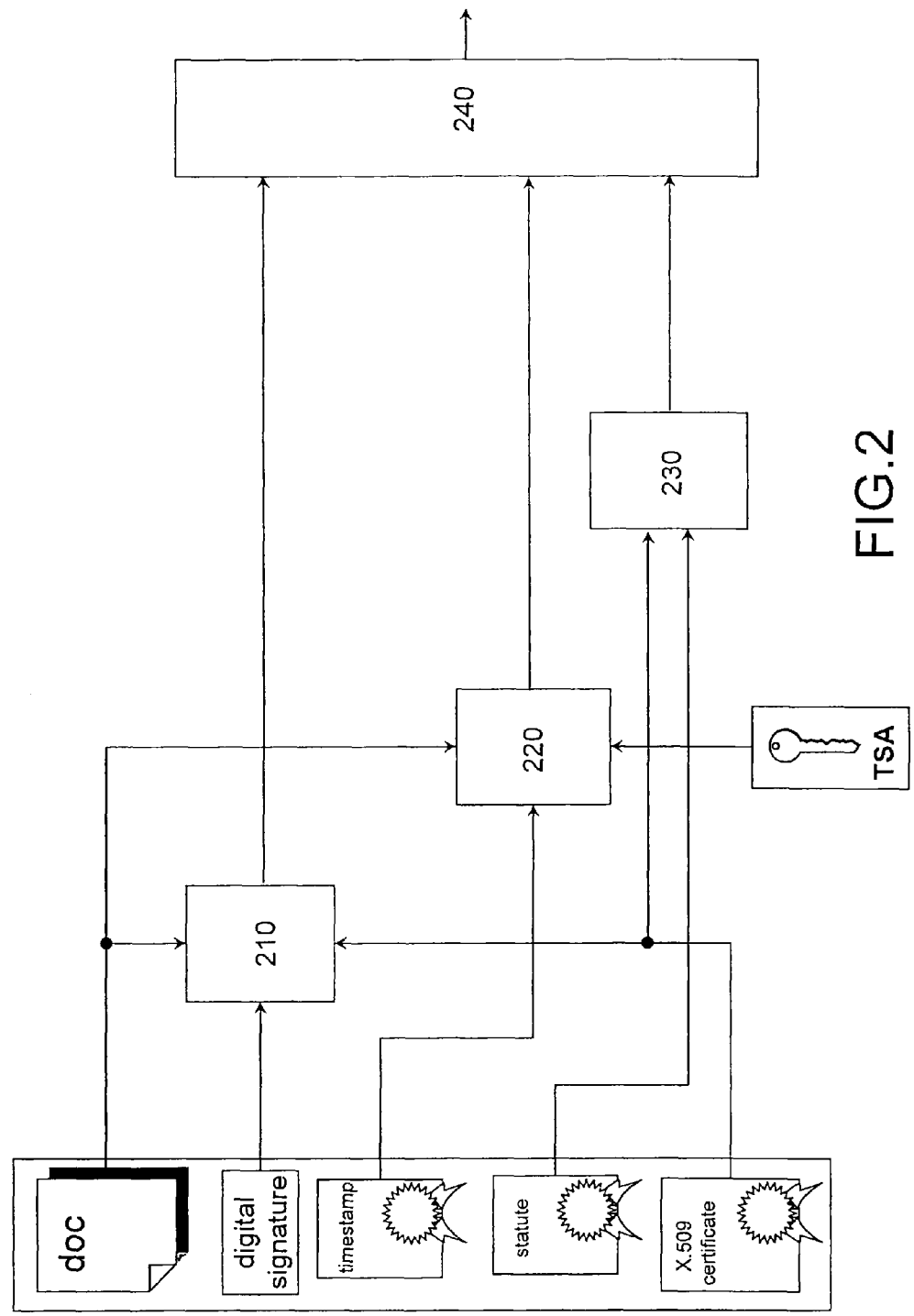
FIG. 2 diagrammatically shows a verification method for the authenticity of an electronic document obtained according to the method of FIG. 1.

FIG. 2 diagrammatically illustrates a verification method for the authenticity of a document obtained by the authentication method according to the invention.

The case where the authenticated electronic document comprises a single file will be considered first.

In a first step 210, the user verifies by means of the digital signature and the public key contained in the certificate that this signature indeed matches the digital fingerprint of the document, in other words if the document in question has been signed by the file supplier.

In a second step 220, the user verifies by means of the signed time-stamp that the moment indicated on the time-stamp has indeed been added to the document in question. More precisely, it checks, by means of the public key of the time stamping authority, if the electronic signature placed on the time-stamp by this authority indeed matches the digital fingerprint of the document, concatenated with the time-stamp.

In a third step 230, the user checks, from the statute 137, that the certificate of the public key of the supplier, 147, is indeed valid at the time when the document was time stamped. More precisely, it verifies that the time marked on the time-stamp 127 is prior to that on the statute certificate 137 and that the latter indeed indicates that the certificate of the public key is valid.

It may be noted that the order of the steps 210, 220, 230 is of no importance as they are independent of one another.

At step 240, the document is concluded to be valid if the three verification steps 210, 220 and 230 are positive. In fact, in this case, the integrity and the origin of the document are certain at the date provided by the time-stamp. The user may deduce, in compliance with the principle mentioned in the introduction, that if the document was valid at this date, and in the absence of proof to the contrary, then the document is still valid.

However, if one of the verifications is negative, the validity of the document is negated.

If the authenticated document is multi-file, the step 210 for verification of the digital signature of the document and the step 220 for verification of the time stamp moment use the collective fingerprint of the files as a digital fingerprint.

Figure 3:
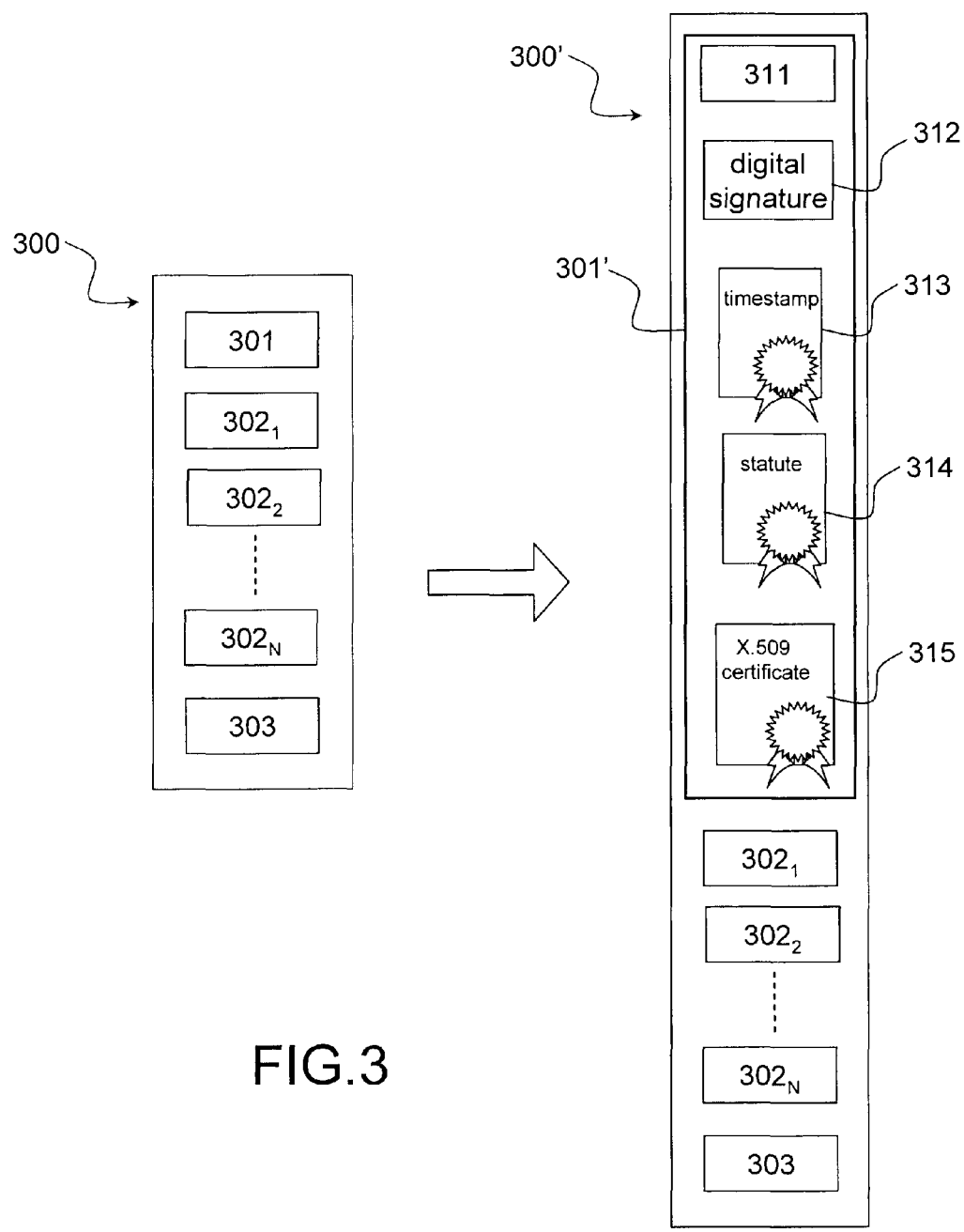
FIG. 3 diagrammatically shows one example of an application of the authentication method according to the invention.

FIG. 3 illustrates one example of an application of the authentication method according to the invention to an electronic document designed to be on-board an aircraft. The document in question shown in 300 complies with the ARINC 665 format and comprises a header file 301, a plurality of data files $302_1$, $302_2$, ... $302_N$, and a support file 303.

The authenticated document 300' is in the form of a secured header file 301' followed by the same data files and the support file. In other terms, the authenticated document 300' only differs from the original document 300 by the content of its header file.

The header file 301' of the authenticated document comprises a first segment 311 whose content is identical to that of the header file 301.

A second segment 312 of the header file contains the digital signature of the document. More precisely, this segment contains firstly the electronic fingerprints of the various files or blocks of data forming these files. These electronic fingerprints are obtained using one or more predetermined hashing functions and are followed by the digital signature itself. The latter is obtained by encoding a collective digital fingerprint of the concatenated individual fingerprints with the private key of the supplier.

The following segments, referenced 313 to 315, of the header file respectively contain the signed time-stamp, the statute of the certificate of the public key of the supplier and the certificate itself.

The header file 301' of the document 300' allows the validity of this document to be guaranteed, especially during an uploading operation on board an aircraft.

The invention claimed is:

1. A computerized authentication method for authentication of an electronic document designed to be sent on-board an aircraft, comprising:

generating a digital signature of said electronic document, said electronic document including at least one program or data file to be sent to the aircraft, using a private key corresponding to a public key certified by a certifying authority;

sending via the Internet a time stamp request of said electronic document to a time stamping authority and receiving in response thereto a time-stamp signed by the time stamping authority;

sending via the Internet a verification request to an Online Certificate Statute Protocol (OCSP) server and receiving in response thereto a statute of a certificate of said public key, following on from said time stamp request;

adding to said electronic document the digital signature, the certificate of said public key, the time-stamp, and the statute of said certificate to create an authenticated electronic document including said at least one program or data file and said digital signature, the certificate of said public key, the time-stamp signed by the time stamping authority, and the statute of said certificate of said public key;

uploading to the aircraft the authenticated electronic document including said at least one program or data file to be sent to the aircraft, wherein said document comprises a plurality of files and that the digital signature of the document is obtained by, generating an individual digital fingerprint for each of said files, generating a collective digital fingerprint for all of said files from their individual digital fingerprints, and encoding the collective digital fingerprint from said private key.

2. The computerized authentication method according to claim 1, wherein the document comprises a file and the signature of the document is obtained by encoding a digital fingerprint of said file with said private key.

3. The computerized authentication method according to claim 1, wherein the document is of the XML type and that the signature of the document is provided in the XMLDsig format.

4. The computerized authentication method according to claim 3, wherein the document complies with the format of the ARINC 665 standard.

5. The computerized authentication method according to claim 1, wherein said certificate of the public key complies with the format of the X.509 standard.

6. A computerized verification method for verifying the validity of an electronic document authenticated by a computerized authentication method according to any one of claims 1, 2, 3, 4, and 5, comprising:

a verification step of the digital signature of said electronic document;

a verification step of the time-stamp signed by the time stamping authority;

a verification step of the statute of the certificate of the public key;

a step for determining the validity of the electronic document, wherein the document is declared to be valid if the previous verifications are positive.

7. The computerized verification method according to claim 6, wherein where the document comprises several files, the verification steps of said digital signature and of said time-stamp use a collective digital fingerprint of said files, wherein said digital fingerprint is obtained by means of individual digital fingerprints of each of these files.

* * * * *